United States Patent
Itsuji et al.

(10) Patent No.: US 12,420,811 B2
(45) Date of Patent: Sep. 23, 2025

(54) DETECTING ANOMALIES IN VEHICLE ARTIFICIAL INTELLIGENCE SYSTEMS

(71) Applicant: Hitachi, Ltd., Tokyo (JP)

(72) Inventors: Hiroaki Itsuji, Novi, MI (US); Subrata Kumar Kundu, Canton, MI (US)

(73) Assignee: HITACHI, LTD., Tokyo (JP)

( * ) Notice: Subject to any disclaimer, the term of this patent is extended or adjusted under 35 U.S.C. 154(b) by 290 days.

(21) Appl. No.: 18/104,356

(22) Filed: Feb. 1, 2023

(65) Prior Publication Data

US 2024/0253644 A1  Aug. 1, 2024

(51) Int. Cl.
| | |
|---|---|
| B60W 50/02 | (2012.01) |
| B60W 30/14 | (2006.01) |
| B60W 50/00 | (2006.01) |
| B60W 50/14 | (2020.01) |
| B60W 60/00 | (2020.01) |
| G06N 20/00 | (2019.01) |

(52) U.S. Cl.
CPC ...... B60W 50/0205 (2013.01); B60W 30/143 (2013.01); B60W 50/0097 (2013.01); B60W 50/14 (2013.01); B60W 60/0015 (2020.02); G06N 20/00 (2019.01); *B60W 2420/403* (2013.01); *B60W 2554/20* (2020.02); *B60W 2554/4029* (2020.02); *B60W 2555/20* (2020.02)

(58) Field of Classification Search
None
See application file for complete search history.

(56) References Cited

U.S. PATENT DOCUMENTS

| | | | |
|---|---|---|---|
| 10,397,019 B2 | 8/2019 | Hartung et al. | |
| 2017/0323179 A1* | 11/2017 | Vallespi-Gonzalez | ................... G06V 20/58 |
| 2019/0213103 A1* | 7/2019 | Morley | ............... G06F 11/3692 |
| 2020/0103909 A1* | 4/2020 | Feinson | ............... G05D 1/0238 |

(Continued)

FOREIGN PATENT DOCUMENTS

| | | |
|---|---|---|
| CN | 115465267 | * 12/2022 |
| JP | 2009146086 A | 7/2009 |
| JP | 2021193516 A | 12/2021 |

OTHER PUBLICATIONS

Akhilan Boopathy, et al., "CNN-Cert: An Efficient Framework for Certifying Robustness of Convolutional Neural Networks", MIT-IBM Watson AI Lab, IBM Research, Nov. 29, 2018.

(Continued)

*Primary Examiner* — Hongye Liang
(74) *Attorney, Agent, or Firm* — Mattingly & Malur, PC

(57) ABSTRACT

In some examples, a vehicle is able to communicate with a computing device over a network. The vehicle includes a processor configured to determine a future driving condition for the vehicle, and further determine that the future driving condition corresponds to a past accident condition. The processor receives, from the computing device, verification data for at least one diagnostic pattern corresponding to the past accident condition. The processor executes an artificial intelligence (AI) algorithm using the verification data corresponding to the at least one diagnostic pattern. Based on determining that an output of the AI algorithm does not correspond to an expected output for the verification data, the processor performs at least one action.

13 Claims, 11 Drawing Sheets

(56) References Cited

U.S. PATENT DOCUMENTS

2023/0351613 A1* 11/2023 Yang ...................... G06T 7/246

OTHER PUBLICATIONS

Shamik Kundu, et al., "Toward Functional Safety of Systolic Array-Based Deep Learning Hardware Accelerators", IEEE Transactions on Very Large Integration (VLSI) System, vol. 29, No. 3, Mar. 2021.

* cited by examiner

| Type of diagnostic patterns | Condition 1 Time | Condition 2 Location | Condition 3 Weather | Condition 4 Camera status | Condition 5 Object |
|---|---|---|---|---|---|
| Unable to detect a vehicle in front due to sun glare at intersection | Daytime | Intersection | Sunny | With sun glare | Vehicle |
| Unable to detect an animal during night at highway | Night | Highway | Any weather | No street lights | Animal |
| Unable to recognize a person dressed as the Joker as a human being | Any time | Intersection | Any weather | Any status | Joker |
| ... | ... | ... | ... | ... | ... |

FIG. 4

| Pattern # | Uncertainty | Correct object | Object in case of misclassification | Safety risk | Uncertainty + Safety risk | Ranking (Priority) |
|---|---|---|---|---|---|---|
| 1 | 0.90 | Vehicle | Wall | 0.50 | 1.40 | 2 |
| 2 | 0.84 | Vehicle | Void | 1.00 | 1.84 | 1 |
| 3 | 0.81 | Vehicle | Wall | 0.50 | 1.31 | 3 |
| ... | ... | ... | ... | ... | ... | ... |

FIG. 5

DETECTING ANOMALIES IN VEHICLE ARTIFICIAL INTELLIGENCE SYSTEMS

BACKGROUND

Advanced driver assistance systems (ADAS) and semi-autonomous vehicle systems, self-driving systems, or otherwise autonomous driving (AD) systems are systems that automate or otherwise enhance vehicle control for improved safety, automated navigation, and the like. Such systems may employ embedded onboard computing devices referred to as "electronic control units" (ECUs), which may include as one or more AD/ADAS ECUs, a powertrain ECU, a chassis ECU, and so forth. For example, an AD/ADAS ECU may be configured to execute domain specific functionalities, e.g., perception, localization, navigation, vehicle control, and the like. To perform these functions, artificial intelligence (AI) algorithms (e.g., machine learning models) may be implemented on AD/ADAS ECUs. Although the use of AI for AD/ADAS in vehicles is expected to be beneficial, ensuring that these systems are operating correctly and safely is challenging.

SUMMARY

In some implementations, a vehicle is able to communicate with a computing device over a network. The vehicle includes a processor configured to determine a future driving condition for the vehicle, and further determine that the future driving condition corresponds to a past accident condition. The processor receives, from the computing device, verification data for at least one diagnostic pattern corresponding to the past accident condition. The processor executes an artificial intelligence (AI) algorithm using the verification data corresponding to the at least one diagnostic pattern. Based on determining that an output of the AI algorithm does not correspond to an expected output for the verification data, the processor performs at least one action.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example lookup table for condition matching with past accident and/or failure scenarios according to some implementations.

FIG. 5 illustrates an example pattern priority data structure that provides priority rankings for various diagnostic patterns including cases of object misclassification according to some implementations.

DESCRIPTION

Figure 1:
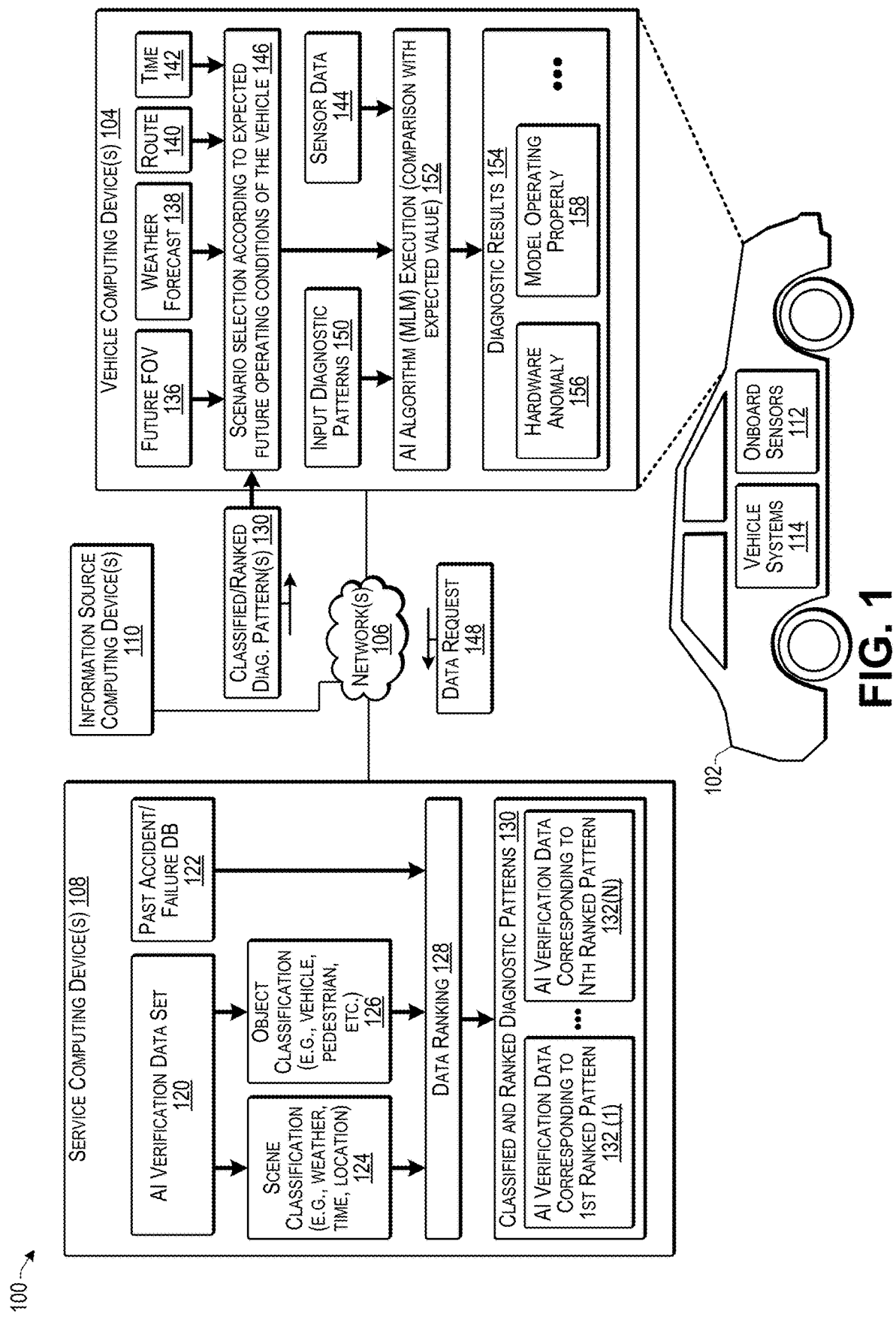
FIG. 1 illustrates a logical configuration of an example system for performing efficient testing of an AI algorithm according to some implementations.

Some implementations herein are directed to techniques and arrangements for performing AI diagnostics that can efficiently detect various AI hardware failure modes and that can be used universally with a high failure detection accuracy rate. The examples herein provide a practical AI diagnostic method for diagnosing AI models implemented on AD/ADAS ECUs or other vehicle computing devices. For example, a vehicle herein may include one or more machine learning models (MLMs) or other types of AI algorithms for performing various functions. In some cases, the MLM(s) or other AI algorithm(s) may be executed on an AD/ADAS ECU or other vehicle computing device on board the vehicle.

Some implementations may include an AI diagnostic technology that can efficiently improve the reliability of in-vehicle AI using a portion of an AI verification data set. Some examples may utilize data corresponding to specific scenarios (e.g., unable to detect another vehicle in front of the ego vehicle due to sun glare at an intersection) as diagnostic patterns by matching past accident/failure conditions with vehicle-side future conditions. After determining a vehicle scenario, such as based on condition matching, the system may perform diagnosis for only the higher priority diagnostic patterns such as based on the magnitude of uncertainty in the AI decision, and further based on a safety risk that would be incurred in the case of AI misclassification (e.g. misclassifying a vehicle as a void is a high safety risk). Thus, the AI diagnostics techniques herein may be executed for efficiently detecting an improperly operating MLM or other AI algorithm, such as may occur due to a hardware failure, hardware intrusion, or other hardware anomaly.

For instance, due to a hardware failure, an AI algorithm, such as an MLM, may begin to behave differently over time as compared to how the MLM performed immediately after training and deployment. There are various factors such as permanent faults in hardware and/or hardware intrusion that could affect the output of the MLM and possibly cause critical accidents. Accordingly, implementations here are able to determine whether an AI algorithm behavior has changed after the training and whether the AI is operating normally (e.g., within an expected range) during execution. For example, during the AI training and verification phase, the correct operation of AI may be verified using a large amount of verification data from a verification data set. However, the size of the AI verification data set may typically be too large to be accessed by a vehicle and/or the amount of processing capacity required for verification may exceed the capabilities of computing devices onboard the vehicle. For instance, it may take months to execute an AI algorithm for a large verification data set using the limited computational resources onboard a vehicle. To address these problems, implementations herein are able use a computing device onboard the vehicle to efficiently verify whether the AI algorithm executed by the vehicle is operating correctly.

The AI diagnostic techniques herein do not require hardware redundancy (e.g., the addition of other AI-executing hardware) and do not depend on any specific hardware. The AI diagnostic techniques described herein are cost effective while also improving vehicle safety by efficiently examining the operation of MLMs and/or other AI models that execute on an AD/ADAS ECU with an accurate failure detection rate and fast detection speed.

Furthermore, when a hardware anomaly occurs in an ECU system, such as may include an AD/ADAS ECU, a powertrain ECU, a chassis ECU, and so forth, the examples herein may efficiently identify the cause of the anomaly, such as which hardware elements are related to the AI model that is not operating correctly. Consequently, the examples herein also improve the maintainability and repair efficiency of an ECU system.

For discussion purposes, some example implementations are described in the environment of an AD/ADAS ECU that executes one or more MLMs onboard a vehicle. However, implementations herein are not limited to the particular examples provided, and may be extended to, other types of computing devices, other types of vehicles, other types of AI algorithms, other types of hardware configurations, other types of local conditions, and so forth, as will be apparent to those of skill in the art in light of the disclosure herein. For example, the solution herein is scalable, and may be applied to ubiquitous systems in addition to ground vehicles, such as construction, farming, and mining equipment, the ships and other marine vehicles, and so forth. Implementations herein may also be scaled to smaller applications, such as autonomous robots and the like.

FIG. 1 illustrates a logical configuration of an example system 100 for performing efficient testing of an AI algorithm according to some implementations. The system 100 includes a vehicle 102 having one or more vehicle computing devices 104 able to communicate over one or more networks 106 with one or more service computing devices 108. In addition, the service computing device(s) 108, and in some cases, the vehicle computing device(s) 104 may be able to communicate over the one or more networks 106 with one or more information source computing devices 110, such as web servers, service providers, public databases, private databases, or the like. The vehicle 102 may further include one or more onboard sensors 112 and one or more vehicle systems 114 that are in communication with the vehicle computing device(s) 104, such as via a CAN bus (controller area network bus) (not shown in FIG. 1) or the like.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

In this example, a server AI diagnosis program (not shown in FIG. 1) executing on the service computing device(s) 108 may receive or otherwise access an AI verification data set 120 that may be proprietary data from one or more private entities and/or publicly available data. The service computing device(s) 108 may further have access to a past accident and/or failure database 122.

As indicated at 124, the service computing device(s) 108 may perform processing of scene classification to determine, e.g., classification of various scenarios that a vehicle might encounter during operation, such as different types of weather, different times of day, different types of roads, different types of surroundings, different types of intersections, and so forth. In the scene classification 124, the AI verification data set 120 is classified according to scenes such as based on weather, location, and time. Any of various known image recognition programs may be used for the scene classification 124.

The service computing device(s) 108 may further perform object classification 126 for objects in the AI verification data set 120. In the object classification 126, selected data from the AI verification data set 120 is classified according to recognized objects such as vehicles, pedestrians, signs, and so forth. Any of various known image recognition programs may be used for the object classification 126.

The past accident/failure DB 122 is used for performing data ranking 128 on the classified scenes and classified objects to create classified and ranked diagnostic patterns 130 that correspond to past accident and/or failure scenarios. For instance, during the ranking, the classified data is ranked according an uncertainty in an AI decision and a likely safety risk in case of misclassification. As a result, the service computing device(s) 108 generates diagnostic patterns for various scenes and objects that correspond to past accident/failure scenarios, such as AI verification data 132(1) corresponding to a 1st ranked pattern, . . . , through 132(N) corresponding to an Nth ranked pattern. For example, a highly ranked pattern may be a vehicle at daytime that may not be visible due to sun glare. Another highly ranked pattern may be a pedestrian in the road at night. For instance, these higher ranked patterns may be the result of a higher uncertainty in the AI decision and a higher safety risk to a vehicle or pedestrian.

At the vehicle 102, such classified and ranked diagnostic patterns 130 may be selected and used for testing an AI algorithm based on an expected future (e.g., upcoming) operating condition of the vehicle 102 such as based on future field of view (FOV) 136, future weather forecast 138, route 140, and time 142. During an idle time of the AI hardware (e.g., the ECU that executes the MLM or other AI algorithm), the input data for an AI algorithm is changed from sensor data 144 to diagnostic patterns, and then the diagnosis on the AI algorithm may be performed.

As one example, a vehicle AI diagnostic program (not shown in FIG. 1) may perform scenario selection 146 according to an expected future operating condition of the vehicle, and may send a data request 148 to the service computing device(s) 108 to obtain classified/ranked diagnostic patterns that correspond to the selected future scenario. For instance, in some examples, a scenario may include the conditions corresponding to a scene as well as one or more objects that may be included in the scene.

As indicated at 150, upon receiving the classified and ranked diagnostic patterns 130 based on the future scenario specified in the data request 148, the diagnostic patterns are input to the AI algorithm for AI algorithm execution and comparison with an expected value, as indicated at 152. If the diagnostic result 154 (i.e., the AI algorithm output) is different from an expected output, the diagnostic results 154 may indicate a hardware anomaly 156. On the other hand, if the diagnostic result 154 (output of the AI algorithm) is within a threshold amount of the expected value, the result is that the model is operating properly 158.

Figure 2:
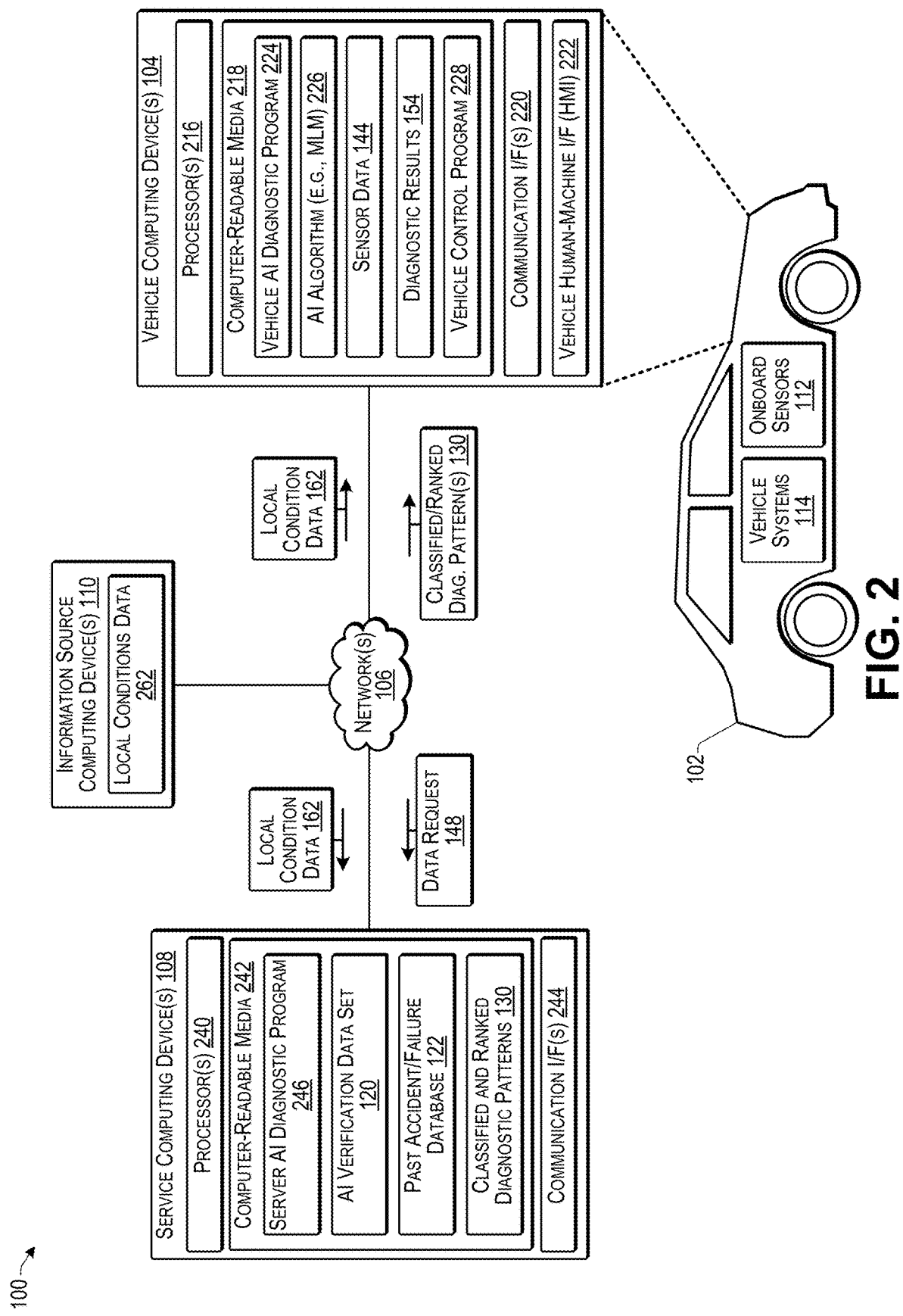
FIG. 2 illustrates an example hardware configuration of the system of FIG. 1 according to some implementations.

FIG. 2 illustrates an example hardware configuration of the system 100 according to some implementations. Each vehicle computing device 104 may include one or more processors 216, one or more computer-readable media 218, one or more communication interfaces (I/Fs) 220, and, in some examples, one or more vehicle human-machine interfaces (HMIs) 122. In some cases, the vehicle computing device(s) 104 may include one or more ECUs (electronic control units) or any of various other types of computing devices. For instance, the vehicle computing device(s) 104 may include one or more ADAS/AD ECUs for controlling at least some of the vehicle systems 114, such as to perform ADAS and/or AD tasks, such as navigation, braking, steering, acceleration, deceleration, and so forth. The vehicle computing device(s) 104 may also include one or more other ECUs, such as for controlling other systems of the vehicle systems 114.

"ECU" is a generic term for any embedded processing system that controls one or more of the systems, subsystems, or components in a vehicle. Software, such as a vehicle control program 228, may be executed by one or more ECUs and may be stored in a portion of the computer-readable media 218 (e.g., program ROM, solid state storage, etc., as discussed below) associated with the respective ECU to enable the ECU to operate as an embedded system. ECUs may typically communicate with each other over a vehicle bus, such as the CAN bus mentioned above, according to a vehicle bus protocol.

Each ECU or other vehicle computing device 104 may include one or more of the processors 216, which may include one or more of central processing units (CPUs), graphics processing units (GPUs), microprocessors, microcomputers, microcontrollers, digital signal processors, state machines, logic circuits, system on chip processors, and/or any devices that manipulate signals based on operational instructions. As one example, the processor(s) 216 may include one or more hardware processors and/or logic circuits of any suitable type specifically programmed or configured to execute the algorithms and other processes described herein. The processor(s) 216 may be configured to fetch and execute computer-readable instructions stored in the computer-readable media 218, which may program the processor(s) 216 to perform the functions described herein.

The computer-readable media 218 may include volatile and nonvolatile memory and/or removable and non-removable media implemented in any type of technology for storage of information, such as computer-readable instructions, data structures, programs, program modules, and other code or data. For example, the computer-readable media 218 may include, but is not limited to, RAM, ROM, EEPROM, flash memory or other memory technology, optical storage, solid state storage, magnetic disk(s), cloud storage, or any other medium that can be used to store the desired information and that can be accessed by a computing device. Depending on the configuration of the vehicle computing device(s) 104, the computer-readable media 218 may be a tangible non-transitory medium to the extent that, when mentioned, non-transitory computer-readable media exclude media such as energy, carrier signals, electromagnetic waves, and/or signals per se. In some cases, the computer-readable media 218 may be at the same location as the vehicle computing device 104, while in other examples, a portion of the computer-readable media 218 may be remote from the vehicle computing device 104.

The computer-readable media 218 may be used to store any number of functional components that are executable by the processor(s) 216. In many implementations, these functional components comprise instructions or programs that are executable by the processor(s) 216 and that, when executed, specifically program the processor(s) 216 to perform the actions attributed herein to the vehicle computing device 104. Functional components stored in the computer-readable media 218 may include the vehicle AI diagnostic program 224 and the vehicle control program 228, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 224, 228 may be part of a single program.

In addition, the computer-readable media 218 may store data, data structures, machine-learning models, and other information used for performing the functions and services described herein. For example, the computer-readable media 218 may store the AI algorithm 226, which may be a machine-learning model. Examples of AI algorithms 226 that may be used in some examples herein may include artificial neural networks, such as self-organizing neural networks, recurrent neural networks, convolutional neural networks, modular neural networks, deep learning neural networks, and so forth, as well as predictive models, decision trees, classifiers, regression models, such as linear regression models, support vector machines, stochastic models, such as Markov models and hidden Markov models, and the like.

Additionally, the computer-readable media 218 may store sensor data 144 received from the onboard sensors 112, and may store diagnostic results 154 that may be determined by the vehicle AI diagnostic program 224. Further, while the data, data structures and AI algorithm 226 are illustrated together in this example, during use, some or all of these elements may be stored on separate ones of the computing device(s) 104. The computing device(s) 104 may also include or maintain other functional components and data, which may include programs, drivers, etc., and the data used or generated by the functional components. Further, the computing device(s) 104 may include many other logical, programmatic, and physical components, of which those described above are merely examples that are related to the discussion herein.

The one or more communication interfaces 220 may include one or more software and hardware components for enabling communication with various other devices, such as over the CAN bus and/or over the one or more network(s) 106. For example, the communication interface(s) 220 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range radio communications such as BLUETOOTH®, and the like, as additionally listed elsewhere herein.

The sensor data 144 may include sensor data received from the onboard sensors 112. For example, the onboard sensors 112 may include any of a plurality of different types of sensors such as a camera system, radar, LIDAR, ultrasound, a satellite positioning system receiver, such as a global navigation satellite system (GNSS) receiver (referred to hereinafter by the common usage name "GPS", which is also intended to be inclusive of any other satellite positioning system), accelerometers, a compass, and the like. In addition, the sensor data 144 used by the vehicle control program 228 may include information received from or associated with various vehicle systems 114, such as (not shown in FIG. 1) from a suspension controller associated with a suspension system, a steering controller associated with a steering system, a vehicle speed controller associated with a braking and acceleration system, and so forth.

For example, the vehicle control program 228 may use rule-based and or artificial-intelligence-based control algorithms (including the AI algorithm 226) to determine parameters for vehicle control. For instance, the vehicle control program 228 may determine an appropriate action, such as braking, steering, accelerating, or the like, and may send one or more control signals to one or more vehicle systems 114 based on the determined action. For example, the vehicle control program 228 may send control signals to the suspension controller, the steering controller, and/or the vehicle speed controller for controlling or partially controlling the vehicle in some applications.

In some cases, if the vehicle AI diagnostic program 224 determines that the AI algorithm 226 is not operating properly, such as due to a hardware anomaly or the like, the vehicle control program 228 may receive these results and, depending on the severity of the anomaly, may perform at least one action such as reducing a speed of the vehicle 102, pulling the vehicle 102 to the side of the road, navigating the vehicle 102 to a repair shop, or the like. As another example, the AI diagnostic program 224 and/or the vehicle control program may provide, such as via the vehicle-human interface 222, an alert or other notification to a human occupant of the vehicle, or may send the notification over the one or more networks 106 to a human in charge of vehicle maintenance when the vehicle AI diagnostic program detects that the AI algorithm 226 is not operating properly.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 240, one or more computer-readable media 242, and one or more communication interfaces 244. Each processor 240 may be a single processing unit or a number of processing units, and may include single or multiple computing units or multiple processing cores. The processor(s) 240 can be implemented as one or more microprocessors, microcomputers, microcontrollers, digital signal processors, central processing units, system-on-chip processors, state machines, logic circuitries, and/or any devices that manipulate signals based on operational instructions. For instance, the processor(s) 240 may be one or more hardware processors and/or logic circuits of any suitable type specifically programmed or configured to execute the algorithms and processes described herein. The processor(s) 240 can be configured to fetch and execute computer-readable instructions stored in the computer-readable media 242, which can program the processor(s) 240 to perform the functions described herein.

The computer-readable media 242 may include volatile and nonvolatile memory and/or removable and non-removable media implemented in any type of technology for storage of information, such as computer-readable instructions, data structures, program modules, or other data. Such computer-readable media 242 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 108, the computer-readable media 242 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 242 may be used to store any number of functional components that are executable by the processors 240. In many implementations, these functional components comprise instructions or programs that are executable by the processors 240 and that, when executed, specifically configure the one or more processors 240 to perform the actions attributed above to the service computing device 108. Functional components stored in the computer-readable media 242 may include a server AI diagnostic program 246 that may be executed to classify and rank the AI verification data set 120 for determining the classified and ranked diagnostic patterns 130.

In addition, the computer-readable media 242 may store data used for performing the operations described herein. Thus, the computer-readable media 242 may include the AI verification data set 120 and the past accident and/or failure database 122, as discussed above. In addition, the computer-readable media 242 may store the classified and ranked diagnostic patterns 130 determined by the server AI diagnostic program 246. Further, the service computing device 108 may also include or maintain other functional components and data not specifically shown in FIG. 2, which may include programs, drivers, etc., and the data used or generated by the functional components. Additionally, the service computing device 108 may include many other logical, programmatic, and physical components, of which those described above are merely examples that are related to the discussion herein.

The communication interface(s) 244 may include one or more interfaces and hardware components for enabling communication with various other devices, such as over the network(s) 106. For example, communication interface(s) 244 may enable communication through one or more of the Internet, cable networks, cellular networks, wireless networks (e.g., Wi-Fi) and wired networks (e.g., fiber optic and Ethernet), as well as close-range radio communications, such as BLUETOOTH®, BLUETOOTH® low energy, and the like, as additionally enumerated elsewhere herein.

The information source computing device(s) 110 may include a hardware configuration similar to the service computing devices 108 described above, but with different functional components and data stored thereon or associated there with. For example, the information source computing devices 110 may store and provide local condition data 162 that may be provided to the service computing device 108 and/or the vehicle computing device(s) 104 for indicating the current and future weather conditions, traffic conditions, mapping information, and the like.

Figure 3A:
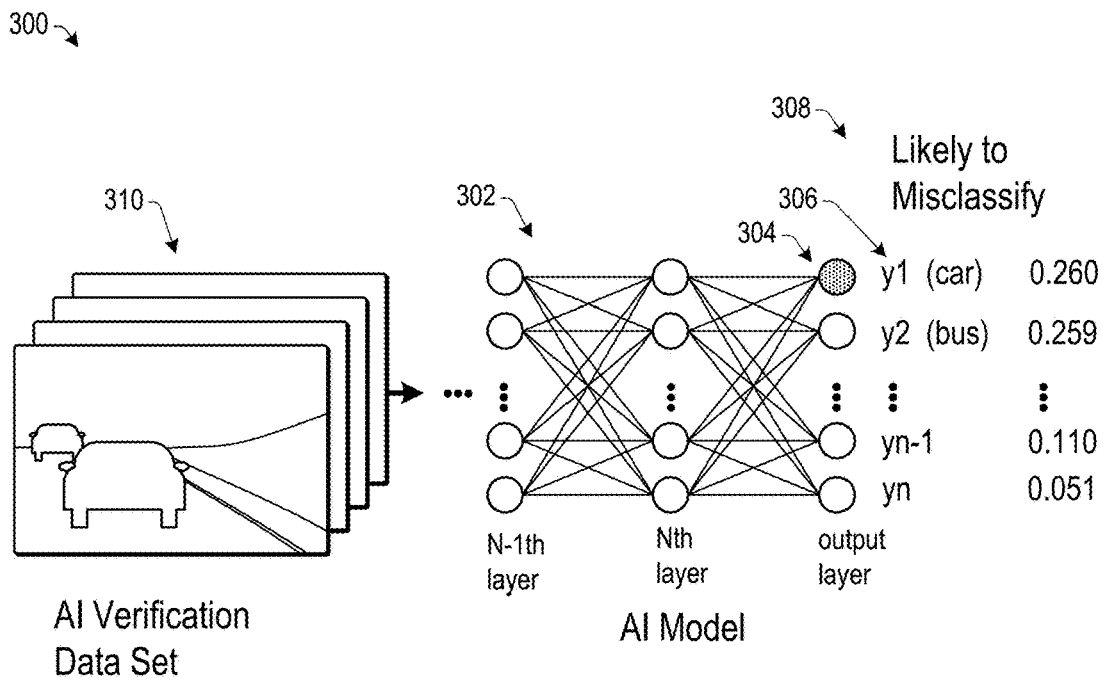
FIGS. 3A and 3B illustrate examples of uncertainty in AI decisions according to some implementations.
Figure 3B:
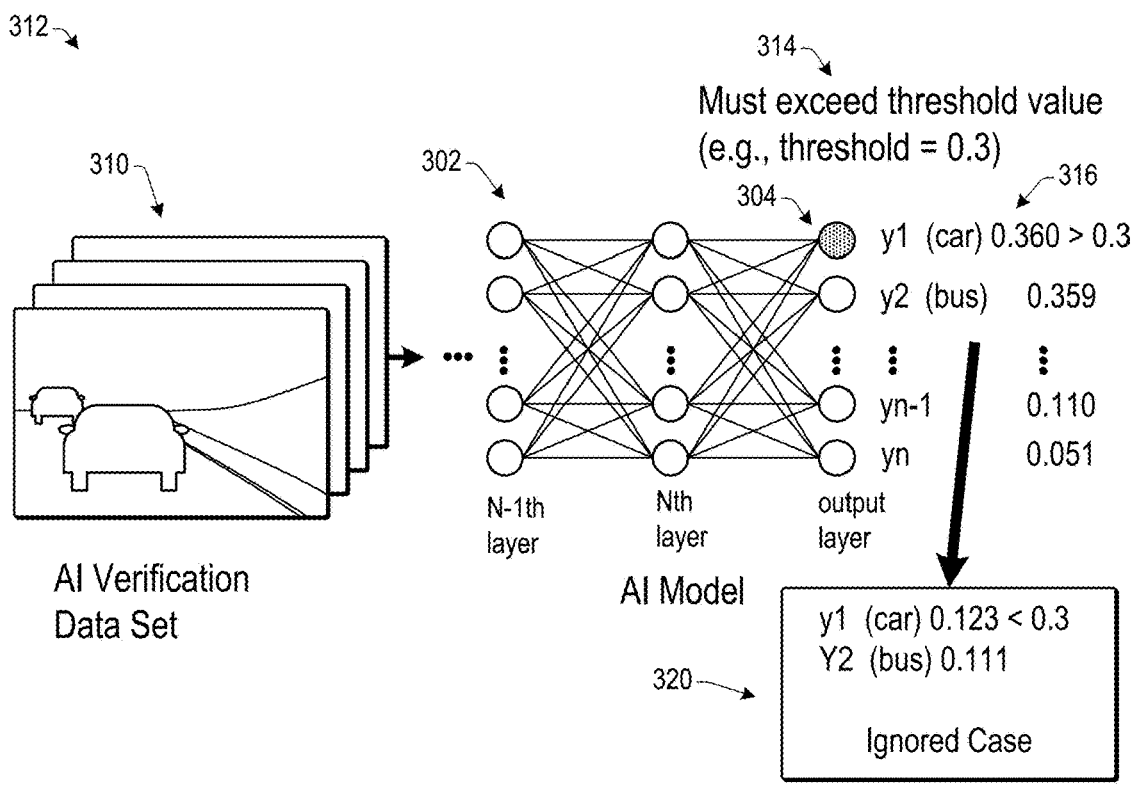

FIGS. 3A and 3B illustrate examples of uncertainty in AI decisions according to some implementations. In the example of FIG. 3A, suppose that an AI model 302 for perception of vehicle surroundings is configured to classify objects in images received from a camera (not shown in FIG. 3A). In the AI model 302, each output node in the output layer of the model 302 corresponds to a probability of an object. For instance, as indicated at 306, the probability that an identified object is a car has the highest probability of 26 percent, while the probability that the object is a bus is 25.9 percent. Accordingly, the object is identified as a car. Nevertheless, because the value of y2 is very close to the value of y1, there is a high degree of uncertainty associated with the classification of the object as a car. Thus, as the value of y2 approaches the value of y1, the uncertainty in the AI decision increases, and as the value of y2 is farther from the value of y1, the uncertainty decreases.

In the example of FIG. 3A, because the value of y2 is close to y1, the condition of the AI decision is near the boundary condition of y1=y2. Accordingly, in this situation, it is likely for AI model to misclassify objects, as indicated at 308, due to hardware failure. Such hardware failures may be detected by checking the AI decisions using images 310 from the AI verification data set. For example, the uncertainty can be quantified, e.g., distance to the boundary condition, for example, by the formula 1/(y1−y2) in the case of the top two results.

FIG. 3B illustrates an example 312 in which the highest ranked result must also exceed a minimum threshold value, which is 0.3 in this example, as indicated at 314. In a first result, as indicated at 316, both y1 and y2 exceed the threshold value, and because y2 is close to y1, there is high uncertainty (i.e., 1/(0.360−0.359)=1000).

On the other hand, as another example, suppose that a result (e.g., from a different image), as indicated at 320, has an output in which the highest output value (y1=0.123) in the AI decision is smaller than the threshold value (i.e., 0.3 in this example). In this case, the AI decision may be ignored or the AI model may classify the object as a void.

FIG. 4 illustrates an example lookup table 400 for condition matching with past accident and/or failure scenarios according to some implementations. As discussed above, from the classified diagnostic patterns, the vehicle computing device 104 may select diagnostic patterns based on the cause and number of vehicle accidents that have occurred so far on upcoming routes and/or for specific vehicle models, vehicle types, or the like. For example, if the most common cause of past failures and/or accidents on an upcoming route at an expected time is "unable to detect a vehicle in front due to sun glare at intersection", the vehicle computing device 104 may run the diagnostic patterns that correspond to this scenario. When checking for a conditional match, a look-up table such as lookup table 400 may be used.

The lookup table 400 may be maintained at the vehicle computing device 104 and/or may be maintained at the service computing devices 108. In general, the lookup table 400 may include a plurality of different types of diagnostic patterns 402 and conditions that correspond to those diagnostic patterns such as time 404, location 406, weather 408, camera status 410, object 412, and so forth. For determining possible diagnostic patterns for the upcoming route, the vehicle computing device 104 or the service computing device 108 may access the lookup table 400 to identify one or more diagnostic patterns 402 based on matching the expected conditions for the upcoming route with the conditions in the lookup table 400. Thus, the computing device may attempt to match the time 404 (e.g., daytime/night), location 406 (e.g., highway, intersection), weather 408 (e.g., sunny, cloudy), possible camera status 410 (e.g., normal, with sun glare, with water drops, no street lights), possible objects 412 (e.g., pedestrian, other vehicle, traffic signal), and so forth. Using the lookup table 400, such matching is performed at either at the vehicle 102 or the service computing device(s) 108 for selecting the diagnostic patterns 402 with the closest matches to the conditions 404-412 in the lookup table 400. As an alternative, rather than relying on the lookup table 400, other examples herein may employ other types of data structures such as a decision tree and a tree searching algorithm for performing the conditional matching.

The ratio of the type of diagnostic patterns (scenarios) can be adjusted to be executed at the vehicle 102 according to the ratio of past accident/failure causes. For example, for upcoming routes, if 80 percent of past accidents were the result of diagnostic pattern 414 ("unable to detect a vehicle in front due to sun glare at intersection"), and 20 percent of past accidents were the result of diagnostic pattern 416 ("unable to detect an animal during night at highway"), 80 percent of resultant diagnostic patterns correspond to diagnostic pattern 414, while 20 percent correspond to diagnostic pattern 416.

FIG. 5 illustrates an example pattern priority data structure 500 that provides priority rankings for various diagnostic patterns including cases of object misclassification according to some implementations. For example, for efficient AI diagnosis, the vehicle computing device 104 may select and execute only high-priority diagnostic patterns from the matched diagnostic pattern scenarios, such as based on the uncertainty of the AI decisions and the predicted safety risk that may result in the case of AI misclassification due to AI hardware failure. In this example, the pattern priority data structure 500 includes a pattern number 502, an uncertainty 504, a correct object 506, an object in case of misclassification 508, a safety risk 510, and uncertainty plus safety risk 512, and a ranking (priority) 514.

For example, as shown in the data structure 500, the pattern 2 may be selected as the best diagnostic pattern for an upcoming scenario by analyzing the sum of the uncertainty plus the safety risk 512. In the illustrated example, the safety risk of pattern 1 and pattern 3 is low since even if the correct object (i.e., a vehicle) is misclassified as a wall (508), the vehicle control command issued by the vehicle control program would still be the same, e.g., "slow down". On the other hand, the safety risk 510 of pattern 2 is high since when the vehicle is misclassified as a void, it is likely to lead to a critical accident because of the vehicle control program is unlikely to cause the vehicle to slow down if there is not an object recognized in front of the vehicle. Accordingly, in this example, pattern 2 has a highest ranking priority 514 because the uncertainty plus the safety risk 512 has the highest value. As another example, if the uncertainty 504 for pattern 2 was very low, then the priority ranking 514 may change to one of the other patterns as having the highest priority, i.e., pattern 1 in this example. The relative values of the safety risks 510 can be determined based on assumed risks, empirical data, or the like.

Figure 6:
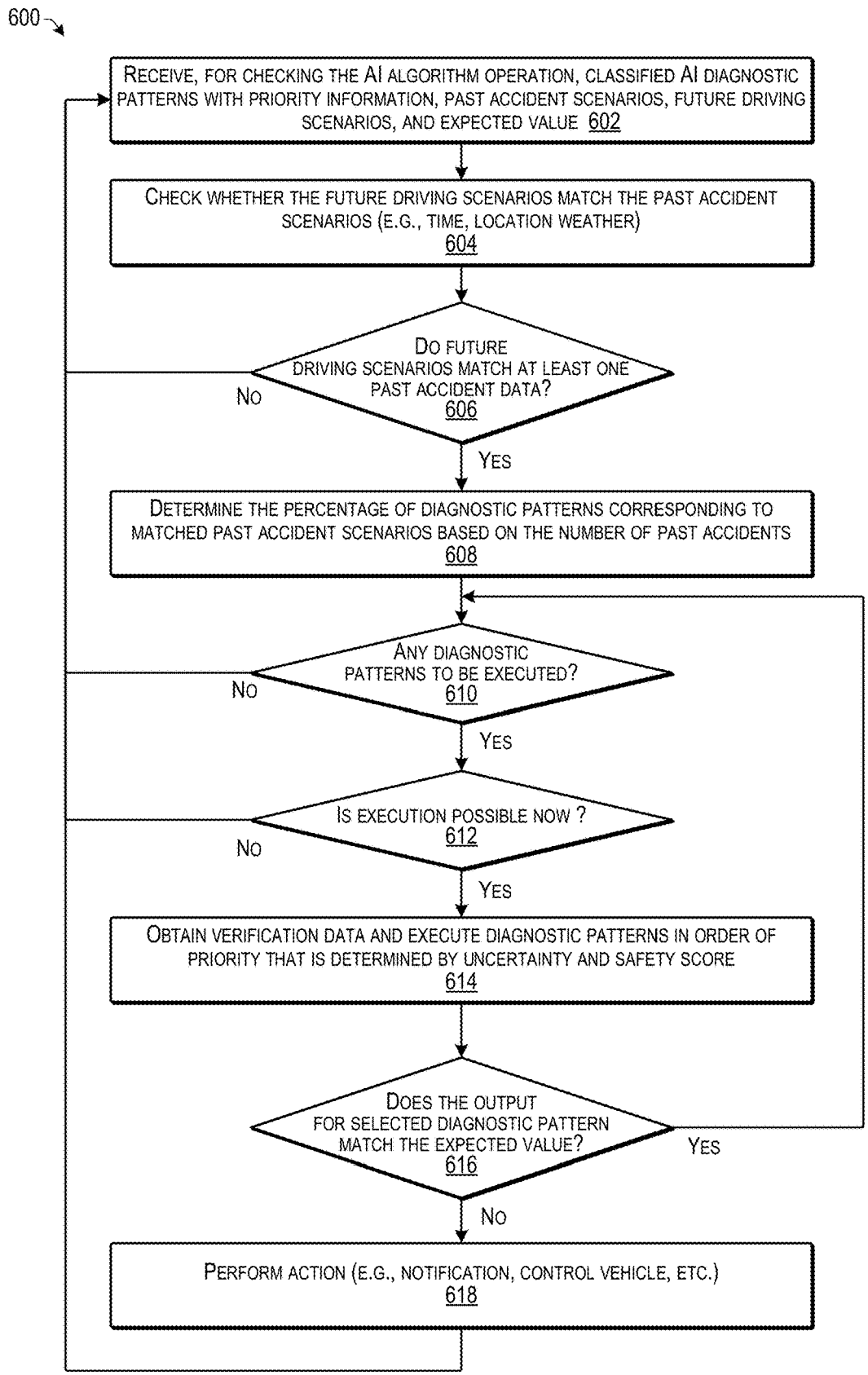
FIG. 6 is a flow diagram illustrating an example process for performing diagnostics on an AI algorithm according to some implementations.
Figure 7:
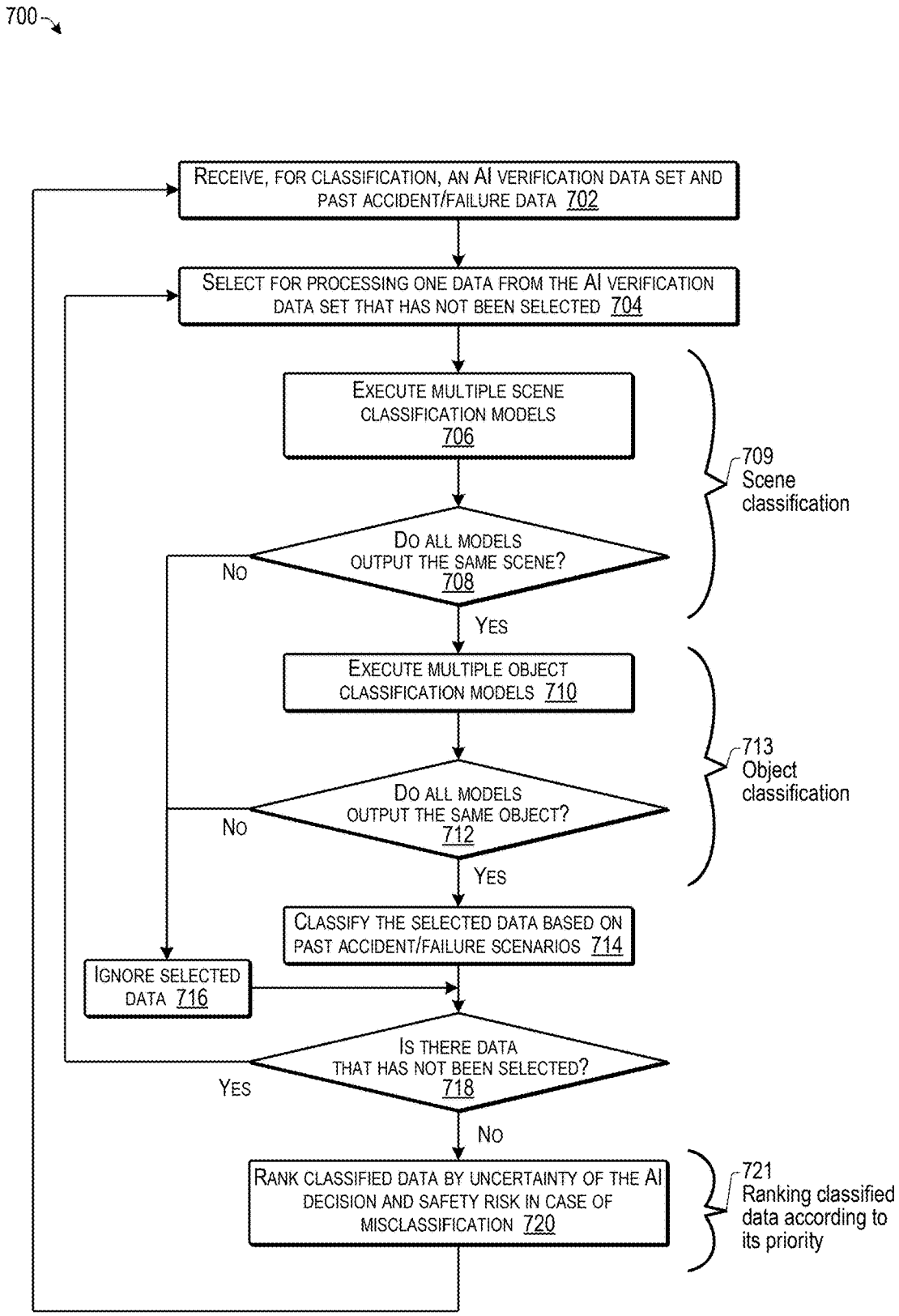
FIG. 7 is a flow diagram illustrating an example process for performing classification and ranking on verification data according to some implementations.
Figure 9:
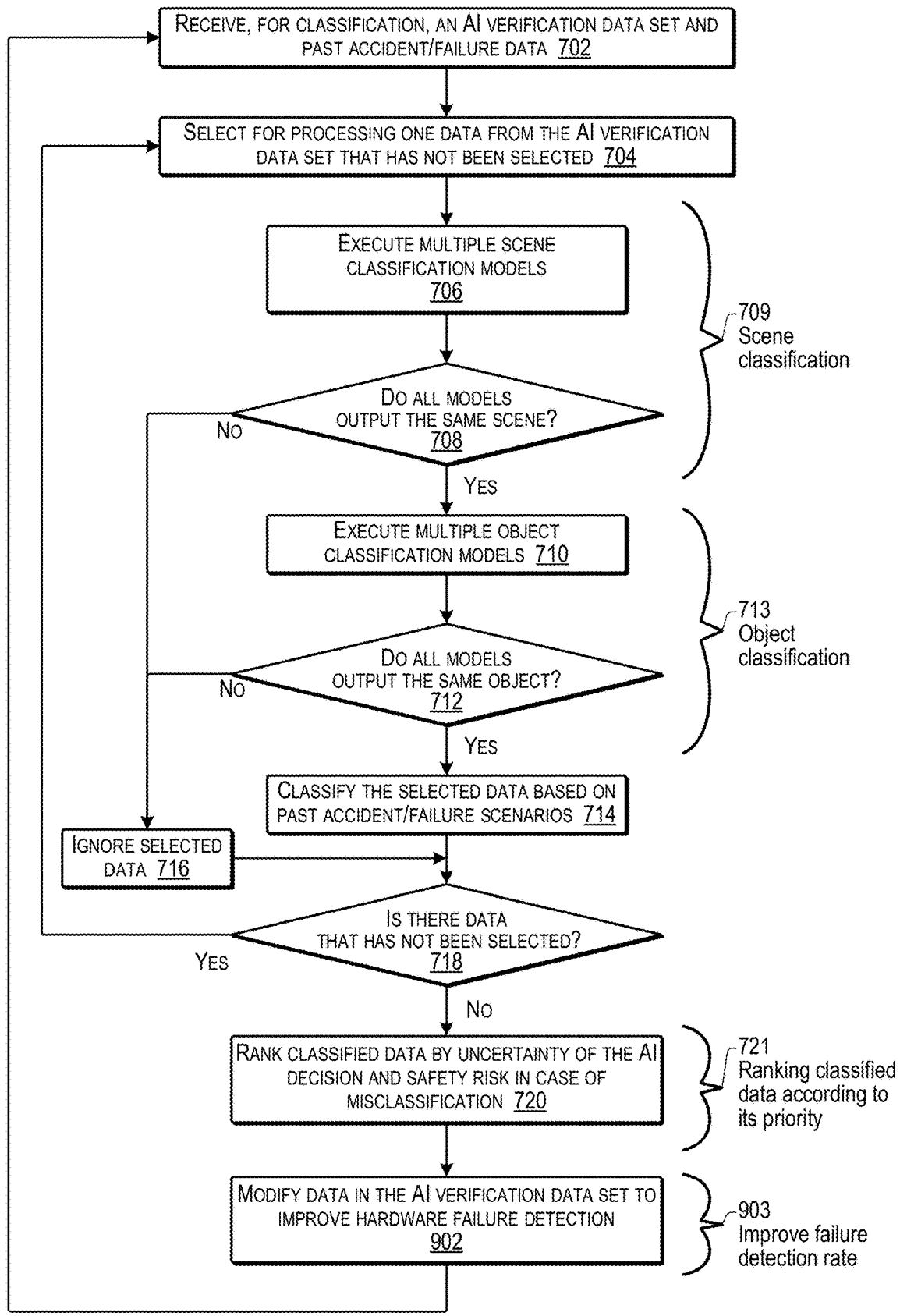
FIG. 9 is a flow diagram illustrating an example process for performing classification and ranking on verification data for generating diagnostic patterns with higher detection rates according to some implementations.

FIGS. 6, 7, and 9 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 6 is a flow diagram illustrating an example process 600 for performing diagnostics on an AI algorithm according to some implementations. In some examples, the process 600 may be executed by the system 100 discussed above. For example, some or all of the process 600 may be executed by the vehicle computing devices 104. In some cases, a portion of the process 600 may be executed by the service computing devices 108.

At 602, the vehicle computing device 104 may receive, for performing diagnosis, classified AI diagnostic patterns with priority information, past accident scenarios, future driving scenarios and expected values. For example, the vehicle may receive the lookup table 400 and the pattern priority data structure 500 from the service computing device 108. Typically, the service computing devices 108 may have already performed the classification and ranking of the diagnostic patterns as discussed above, e.g., with respect to FIG. 1.

At 604, the vehicle computing device 104 may check whether the future driving scenarios match the past accident scenarios (e.g., time, location, weather).

At 606, the vehicle computing device 104 may determine whether future driving scenarios match at least one past accident data.

At 608, the vehicle computing device 104 may determine the percentage of diagnostic patterns corresponding to matched past accident scenarios based on the number of past accidents.

At 610, the vehicle computing device 104 may determine whether there are any matched diagnostic patterns to be executed. If so, the process goes to 612. If not, the process returns to 602 to wait for a next instruction for performing diagnosis.

At 612, if there are one or more diagnostic patterns are to be executed for performing the diagnosis on the AR algorithm, the vehicle computing device 104 may first determine whether the one or more processors of the vehicle computing device 104 are sufficiently idle to devote processing capacity for performing the diagnosis. If so, the process goes to 614. If not, the process returns to 602.

At 614, the vehicle computing device 104 may obtain verification data and execute diagnostic patterns in order of the priority, which is determined by the uncertainty and the safety score for the respective diagnostic patterns. For example, as discussed above with respect to FIG. 5, the priority ranking for testing the AI algorithm operation may be determined based on the uncertainty plus the safety score.

At 616, the vehicle computing device 104 may determine whether the output of the diagnostic testing for the selected diagnostic pattern matches an expected value corresponding to the verification data used. For example, if the verification data includes images of a particular object the comparison determines whether the output of the AI algorithm correctly identified the object included in the verification data. If the output matches the expected value, the process may return to 610 to determine whether there are any additional diagnostic patterns to be executed. On the other hand, if the output does not match the expected value, the process may proceed to 618.

At 618, when the output of the AI algorithm does not match the expected value, the vehicle computing device 104 may perform at least one action. For example, the vehicle computing device 104 may send a notification to a vehicle occupant, e.g., via the human machine interface 222 discussed above with respect to FIG. 2. Additionally, or alternatively, the vehicle computing device may send a notification to a computing device or other device associated with a maintenance facility for requesting maintenance be performed on the vehicle 102. As yet another alternative, if the vehicle is currently operating on a road, the vehicle control program 228 may cause the vehicle to slow down, pullover, drive to a maintenance facility, or the like. Numerous other variations will be apparent to those of skill in the art having the benefit of the disclosure herein.

FIG. 7 is a flow diagram illustrating an example process 700 for performing classification and ranking on verification data according to some implementations. In some examples, the process 700 may be executed by the system 100 discussed above. For example, at least a portion of the process 700 may be executed by the service computing devices 108.

In this example, the service computing device(s) 108 can classify and rank the AI verification data without manual operations. For instance, to correctly classify the AI verification data without manual operations, some examples herein may use multiple models for performing scene classification and object classification. The selected data may be considered as diagnostic patterns, such as only when the classification results for all models are the same. If the results are not the same for all AI models, the selected data may be ignored. After the classification stage, the selected and classified data may be ranked based on uncertainty in the AI decision and the safety risk that is incurred in the case of AI misclassification.

In some cases different AI models used for object detection may output unique values regarding the distance of a recognized object. In this event, the averaged distance may be used for determining the ranking. Additionally, some examples may also use the value of distance for the AI model to be implemented on the vehicle 102. Lastly, the classified data may be sorted based on the value of the distance so that only high-priority diagnostic patterns are executed at the vehicle 102. This may include AI models that are implemented on the vehicle 102.

At 702, the vehicle computing device 104 may receive, for classification, an AI verification data set and past accident and/or failure data. For example, as discussed above with respect to FIG. 1, the AI verification data set and/or the past accident and/or failure data may be maintained by the service computing devices 108 and/or may be obtained from other computing devices of the same or different entities, which may be public or private computing devices.

At 704, the vehicle computing device 104 may select, for processing, one data from the AI verification data set that has not yet been selected.

At 706, the vehicle computing device 104 may execute multiple different scene classification models on the selected data.

At 708, the service computing device 108 may determine whether all of the scene classification models output the same scene information. If so, the process goes to 710. If not, the process goes to 716. Together, blocks 706 and 708 correspond to scene classification 709.

At 710, the service computing device 108 may execute multiple different classification object classification models on the selected data.

At 712, the service computing device 108 may determine whether all of the object classification models output the same object information. If so, the process goes to 714. If not, the process goes to 716. Together, blocks 710 and 712 correspond to object classification 713.

At 714, the service computing device 108 may classify the selected data based on past accident and/or failure scenarios.

At 716, when the scene classification models do not output the same scene information for the same data or the object classification models do not output the same object information for the same data, the service computing device 108 may ignore the selected data and proceed to 718.

At 718, the service computing device 108 may determine whether there is AI verification data in the AI verification data set that has not yet been selected for processing. If so, the process goes back to 704 to select a next piece of data for processing. If not, the process goes to 720.

At 720, the service computing device 108 may rank the classified data by uncertainty of the AI decision and by the safety risk in the case of a misclassification. Accordingly, block 720 corresponds to a ranking step 721 for ranking the classify data according to its priority. For example, as discussed above with respect to FIG. 5 the uncertainty and the safety risk may be used to determine a combined score for ranking the classified data. Various other possible ranking techniques will be apparent to those of skill in the art having the benefit of the disclosure herein.

Figure 8:
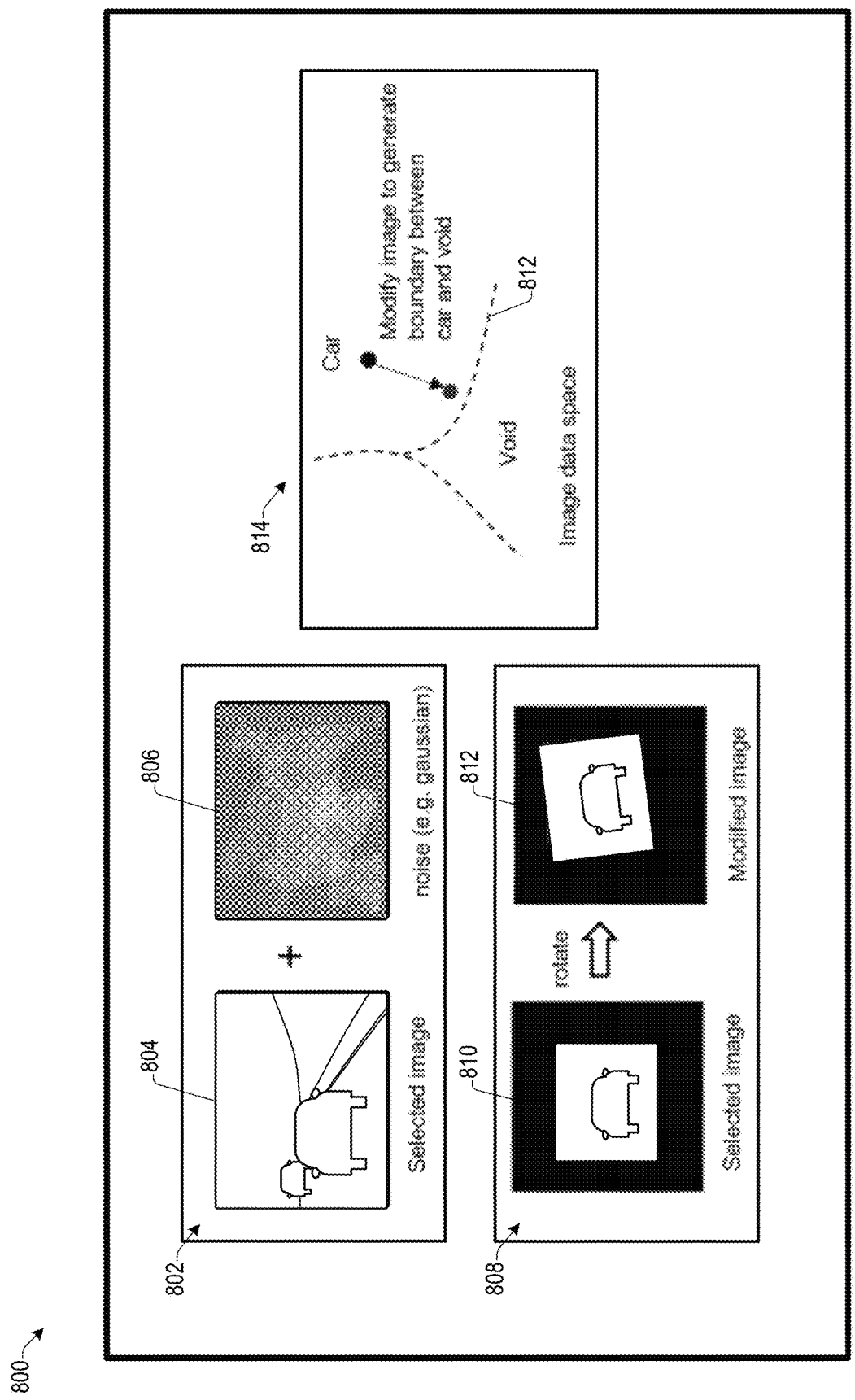
FIG. 8 illustrates an example of modifying verification data to improve hardware failure detection according to some implementations.

FIG. 8 illustrates an example 800 of modifying verification data to improve hardware failure detection according to some implementations. In this example, the service computing device 108 may generate diagnostic patterns with higher hardware failure detection rates by modifying the AI verification data in some manner for providing additional AI verification data. As illustrated in the example of FIG. 8, the system may modify the original verification data so that the data may be moved closer to the boundary where the AI decision is likely to be changed due to a hardware failure.

In a first example, as indicated at 802, a selected image 804 from the AI data verification set may be modified by injecting noise 806 into the image 804. For example, the noise may be gaussian noise, noise produced by a generative adversarial network, or the like.

In a second example, as indicated at 808, a selected image 810 from the AI data verification set may be modified by rotating, skewing, mirroring, or other transition of the object in the image as indicated at 812. Furthermore, while two examples of techniques for modifying verification data are described herein, numerous other techniques will be apparent to those of skill in the art having the benefit of the disclosure herein.

As indicated at 814, the above-discussed techniques for modifying the AI verification data can be used to generate a boundary 816 in the image data space and can move the data closer to the boundary 816. For example, for inferring objects in images, the object detection algorithms (AI models) may output the probability for all objects defined in the training phase (e.g. car: 30%, bus: 20%, person: 10%, and so forth). Boundaries represent states, e.g., where the probability of one object with a highest value is equal to the probability of another object with second highest value. When the highest value gets closer to the second highest value after modifying the image data, this may indicate that the image data is getting closer to the boundary. For instance, an image may have N-dimensional information and the boundary may be also expressed in N-dimensions, but for simplicity, the boundary may be represented in two dimensions, such as the boundary indicated at 812.

FIG. 9 is a flow diagram illustrating an example process 900 for performing classification and ranking on verification data for generating diagnostic patterns with higher detection rates according to some implementations. In some examples, the process 900 may be executed by the system 100 discussed above. For example, the process 900 may be executed by the service computing devices 108.

Blocks 702-720 may be executed as discussed above with respect to FIG. 7.

At 902, the vehicle computing device 104 may modify data in the AI verification data set, such as discussed above with respect to FIG. 8, and then may re-execute blocks 702-720 for the modified AI verification data. For example, as discussed above, modifying the data in the AI verification data set can help to improve the hardware failure detection capabilities of the system herein. As indicated at 903 step 902 improves the failure detection rate in the techniques applied herein.

Figure 10:
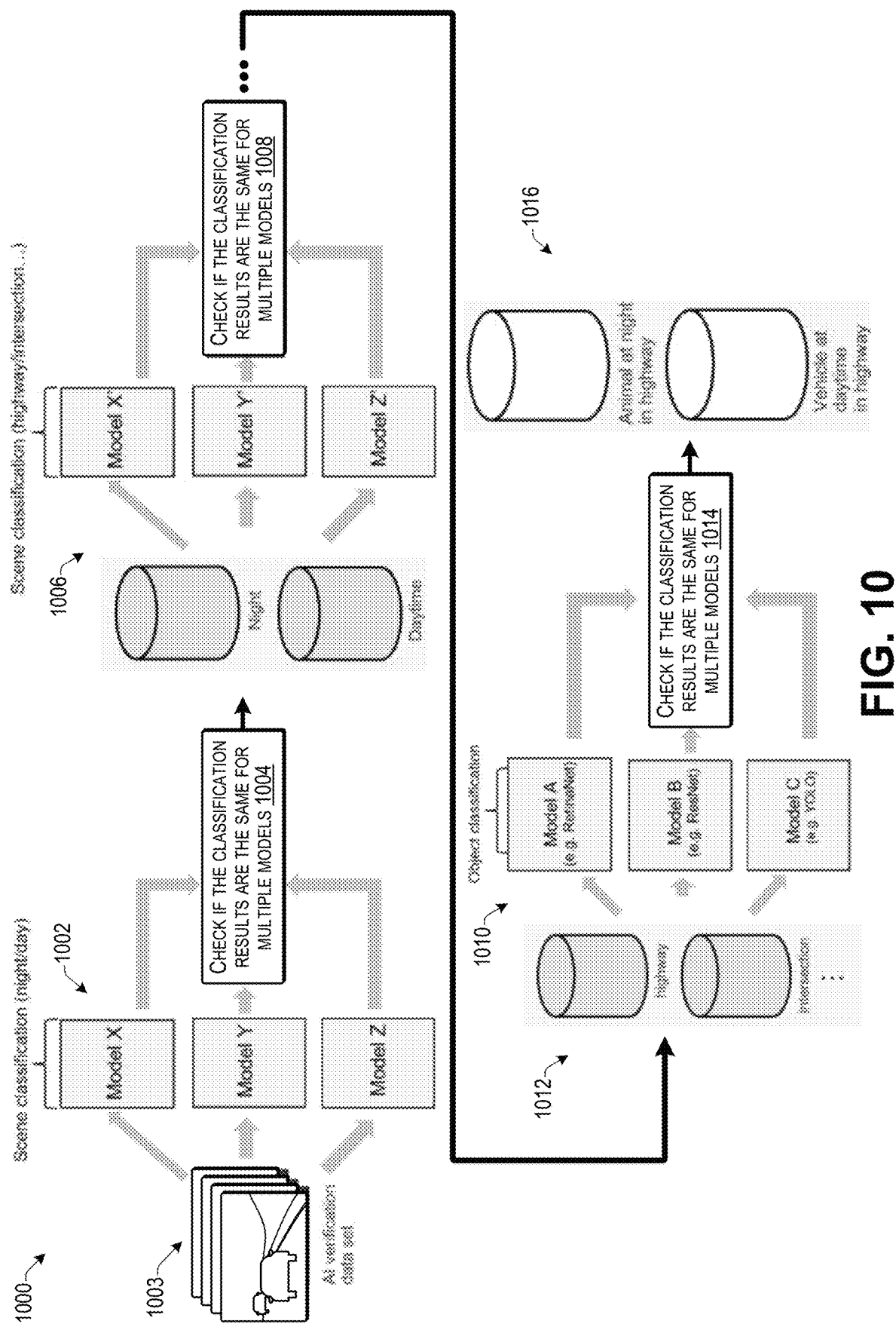
FIG. 10 illustrates an example for multistage scene classification according to some implementations.

FIG. 10 illustrates an example 1000 for multistage scene classification according to some implementations. As one example, for fast AI diagnosis, the service computing device 108 may classify scenes in multiple stages as shown in FIG. 10 for reducing the number of diagnostic patterns per scenario that might be run at the vehicle 102. This multistage scene classification technique may increase the number of scenarios of diagnostic patterns to enable more precise selection of relevant diagnostic patterns.

In the example of FIG. 10, and as discussed above with respect to FIG. 7, multiple scene classification models are used for each scene classification stage, and multiple object classification models are used for each object classification. In this example, the service computing device may classify scenes in multiple stages based on past accident/failure scenarios. Thus in this example, as indicated at 1002, suppose that the process uses three different scene classification models X, Y, and Z to perform a first scene classification according to a time frame (e.g., night or daytime). Then, at 1004, the process may check whether the classification results are the same for the multiple models X, Y, Z. If not, the process may stop and select other data from the AI verification data set 1003. If the classification results are the same, the process may then go to the next stage 1006 to perform further classification on the data that has already been classified as "night" or "daytime".

At the second scene classification stage 1006 suppose that the process performs scene classification according to location such as highway, intersection, rural road, suburban road, etc., using multiple scene classification models X', Y', and Z'. Then, at 1008, the process may check to see whether the classification results are the same for the multiple models. If not, the process may return to the beginning and select more data from the AI verification data set 1003 for classification. On the other hand, if the classification results are the same for all of the scene classification models X', Y', and Z', scene classification may move on to a next scene classification stage such as camera status (e.g. normal, with sun glare, with waterdrop), weather (e.g., sunny, raining, snowing) and so on (not shown in FIG. 10).

When all of the scene classification has been completed, then, as indicated at 1010, the process may use multiple object classification models A, B, and C to perform object classification on the classified scene data 1012. As indicated at 1014, the process may then check to see if the classification results are the same for the multiple object classification models. If not, the process may discard the data and return to the beginning to select more data from the AI verification data set 1003. On the other hand, if the classification results are the same for the multiple object classification models, the classified data 1016 may be stored and subsequently ranked as discussed above, e.g. with respect to FIGS. 1, 5, and 7.

Figure 11:
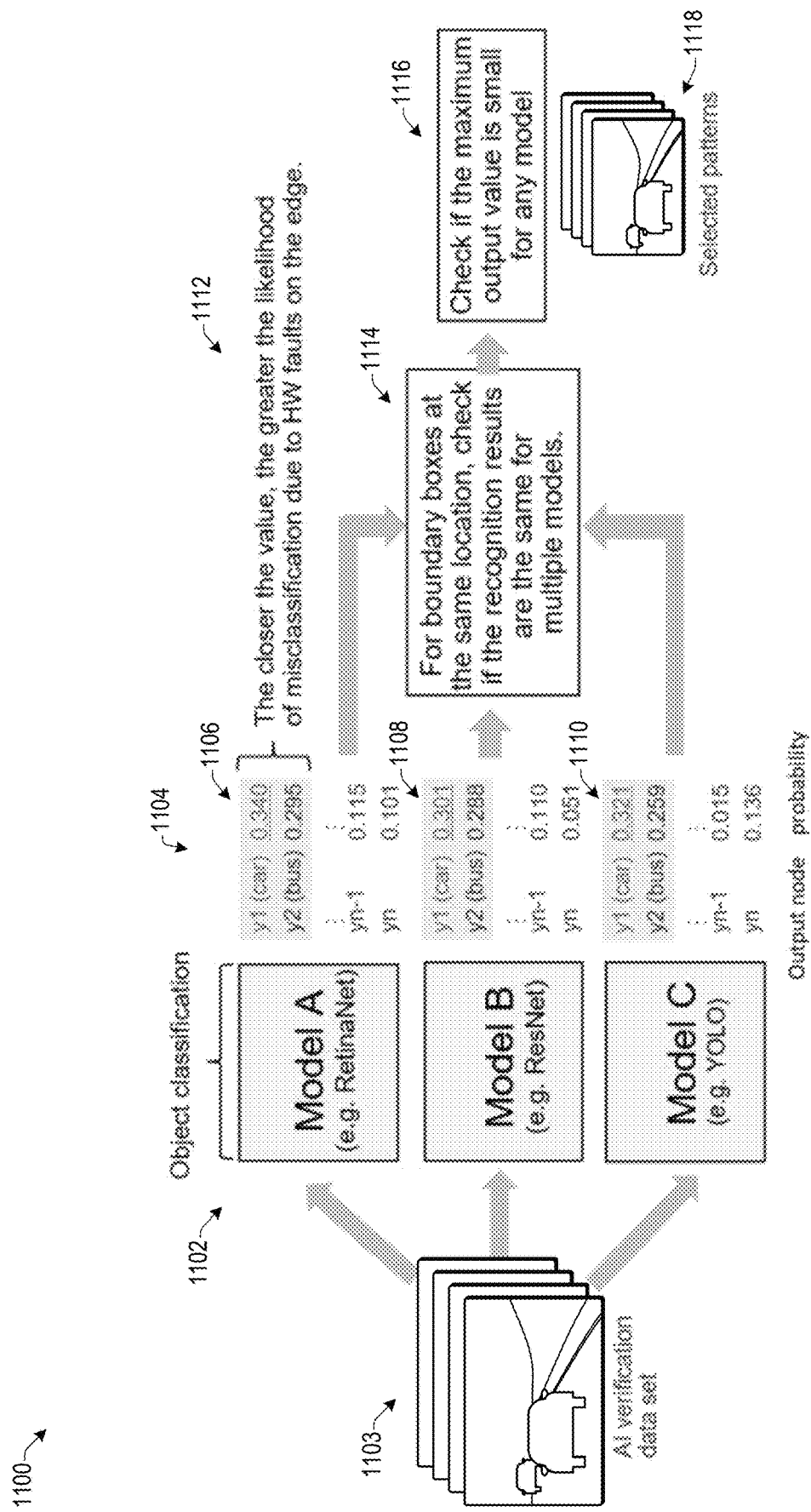
FIG. 11 illustrates an example including selection of data for which it is difficult for various AI models to determine objects according to some implementations.

FIG. 11 illustrates an example 1100 including selection of data for which it is difficult for various AI models to determine objects according to some implementations. In this example, as indicated at 1102, multiple AI models A, B, and C are used for object classification. For fast AI diagnosis, the service computing device(s) 108 may only select data from the AI verification data set 1103 for which it is difficult for various AI models to identify objects in the image. For instance, suppose the results 1104 presented in FIG. 11 represent the outputs of the three AI models A, B, and C for a particular image in the AI verification data set 1103.

In this example, the final decision by all three AI models A, B, and C, is "car", i.e., as indicated at 1106, 1108, and 1110, respectively. However, the final decision of each AI model might be changed to "bus" easily if there is a hardware anomaly. In particular, as indicated at 1112, the closer the y2 value is to the y1 value, the greater the likelihood of misclassification due to a hardware anomaly.

In the example, of FIG. 11, after analyzing the locations of the boundary boxes in images of the AI verification data set 1103 (e.g., degree of boundary-box overlaps), the decisions by the AI models A, B, and C are compared for each object identified in an image to check whether the maximum output value is small for any of the models. For instance, as indicated at 1114, for images that have boundary boxes at the same location, the system may check whether the recognition results are the same for the multiple AI models A, B, and C. If so, at 1116, the system checks whether the maximum output value is small for any of the models. These images 1118 may be selected for use as the images provided to the vehicle for checking the operation of the AI model on the vehicle, which reduces the number of data (i.e., candidates of diagnostic patterns) for enabling faster AI diagnosis at the vehicle 102. In the foregoing process, the system is selecting patterns/images, which means that the number of AI verification data images is much larger than the number of classified/ranked images. For example, if none of the objects in an image satisfies the conditions 1114, the image will be excluded from the selected candidates of diagnostic patterns.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A system comprising:
a vehicle able to communicate with a computing device over a network, the vehicle including one or more processors configured by executable instructions to perform operations comprising:
determining a future driving condition for the vehicle;
determining that the future driving condition corresponds to a past accident condition;
receiving, from the computing device, verification data for at least one diagnostic pattern corresponding to the past accident condition;
executing an artificial intelligence (AI) algorithm using the verification data corresponding to the at least one diagnostic pattern; and
based on determining that an output of the AI algorithm does not correspond to an expected output for the verification data, determining, by the one or more processors, that a hardware anomaly has occurred and performing at least one action including changing an operating speed of the vehicle,
wherein the at least one diagnostic pattern comprises a plurality of diagnostic patterns, wherein diagnostic patterns of the plurality of diagnostic patterns are ranked in an order of priority, the operations further comprising executing the AI algorithm using the verification data in the order of priority from a higher priority to a lower priority, and
wherein the order of priority is based at least in part on an uncertainty in a classification decision made by another AI algorithm and a predicted safety risk in a case of object misclassification by the AI algorithm.

2. The system as recited in claim 1, wherein the diagnostic patterns of the plurality of diagnostic patterns are determined by:
    classifying verification data images based on scenes and objects in the verification data images; and
    ranking the classified verification data images based on similarity to at least one of past accident scenarios or past failure scenarios.

3. The system as recited in claim 1, wherein the future driving condition includes at least one of: a time of day, a location, a weather condition, or a camera status.

4. The system as recited in claim 1, wherein there are a plurality of future driving conditions, the operations further comprising selecting the at least one diagnostic pattern based on correspondence with the plurality of future driving conditions.

5. A method comprising:
    selecting, by one or more processors, for processing, data from a verification data set including a plurality of images;
    executing a plurality of scene classification models on the selected data;
    based at least on determining that outputs of the plurality of scene classification models correspond to each other, executing a plurality of object classification models on the selected data;
    based at least on determining that outputs of the plurality of object classification models correspond to each other, ranking the selected data with other classified data from the verification data based on at least one of past accident scenarios or past failure scenarios;
    determining a future driving condition for a vehicle;
    determining that the future driving condition corresponds to a past accident condition;
    receiving a portion of the verification data for at least one diagnostic pattern corresponding to the past accident condition;
    executing an artificial intelligence (AI) algorithm using the portion of the verification data corresponding to the at least one diagnostic pattern; and
    based on determining that an output of the AI algorithm does not correspond to an expected output for the verification data, determining, by the one or more processors, that a hardware anomaly has occurred and performing at least one action including changing an operating speed of the vehicle,
    wherein the at least one diagnostic pattern comprises a plurality of diagnostic patterns, wherein diagnostic patterns of the plurality of diagnostic patterns are ranked in an order of priority, the method further comprising executing the AI algorithm using the verification data in the order of priority from a higher priority to a lower priority, and
    wherein the order of priority is based at least in part on an uncertainty in a classification decision made by another AI algorithm and a predicted safety risk in a case of object misclassification by the AI algorithm.

6. The method as recited in claim 5, wherein the future driving condition includes at least one of: a time of day, a location, a weather condition, or a camera status.

7. The method as recited in claim 5, wherein executing the plurality of scene classification models on the selected data comprises: performing scene classification of the selected data in a series of scene classification stages, wherein each stage corresponds to a different condition.

8. The method as recited in claim 5, further comprising modifying the verification data to increase a likelihood of hardware anomaly detection when the verification data is executed by an artificial intelligence algorithm.

9. A system comprising:
    one or more processors, configured by executable instructions to perform operations comprising:
        selecting, for processing, data from a verification data set including a plurality of images;
        executing a plurality of scene classification models on the selected data;
        based at least on determining that outputs of the plurality of scene classification models correspond to each other, executing a plurality of object classification models on the selected data;
        based at least on determining that outputs of the plurality of object classification models correspond to each other, ranking the selected data with other classified data from the verification data based on at least one of past accident scenarios or past failure scenarios;
        determining a future driving condition for a vehicle;
        determining that the future driving condition corresponds to a past accident condition;
        receiving a portion of the verification data for at least one diagnostic pattern corresponding to the past accident condition;
        executing an artificial intelligence (AI) algorithm using the portion of the verification data corresponding to the at least one diagnostic pattern; and
        based on determining that an output of the AI algorithm does not correspond to an expected output for the verification data, determining, by the one or more processors, that a hardware anomaly has occurred and performing at least one action including changing an operating speed of the vehicle,
        wherein the at least one diagnostic pattern comprises a plurality of diagnostic patterns, wherein diagnostic patterns of the plurality of diagnostic patterns are ranked in an order of priority, the operations further comprising executing the AI algorithm using the verification data in the order of priority from a higher priority to a lower priority, and
        wherein the order of priority is based at least in part on an uncertainty in a classification decision made by another AI algorithm and a predicted safety risk in a case of object misclassification by the AI algorithm.

10. The system as recited in claim 9, further comprising modifying the verification data to increase a likelihood of hardware anomaly detection when the verification data is executed by an artificial intelligence algorithm.

11. The system as recited in claim 10, wherein modifying the verification data comprises at least one of:
    adding noise to an image; or
    changing an image by at least one of rotating the image, mirroring the image, or skewing the image.

12. The system as recited in claim 9, wherein executing the plurality of scene classification models on the selected data comprises: performing scene classification of the selected data in a series of scene classification stages, wherein each stage corresponds to a different condition.

13. The system as recited in claim 9, further comprising:
    performing object classification of the selected data by determining a degree of overlap of boundary boxes in the selected data; and
    for boundary boxes at a same location, checking whether object classification results are for a same object.

* * * * *